United States Patent
Kobayashi et al.

(10) Patent No.: US 11,021,087 B2
(45) Date of Patent: Jun. 1, 2021

(54) VEHICLE SEAT

(71) Applicant: TACHI-S CO., LTD., Akishima (JP)

(72) Inventors: Shinnosuke Kobayashi, Akishima (JP); Akinori Taniguchi, Akishima (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 16/816,250

(22) Filed: Mar. 11, 2020

(65) Prior Publication Data

US 2020/0307428 A1    Oct. 1, 2020

(30) Foreign Application Priority Data

Apr. 1, 2019    (JP) .............................. JP2019-069952

(51) Int. Cl.
| | |
|---|---|
| *B60N 2/66* | (2006.01) |
| *B60N 2/58* | (2006.01) |
| *B60N 2/64* | (2006.01) |
| *B60N 2/70* | (2006.01) |
| *B60N 2/90* | (2018.01) |

(52) U.S. Cl.
CPC .................. *B60N 2/66* (2013.01); *B60N 2/58* (2013.01); *B60N 2/646* (2013.01); *B60N 2/7029* (2013.01); *B60N 2/986* (2018.02)

(58) Field of Classification Search
CPC ........ B60N 2/58; B60N 2/646; B60N 2/7029; B60N 2/968
See application file for complete search history.

(56) References Cited

FOREIGN PATENT DOCUMENTS

| | | |
|---|---|---|
| JP | S59-052972 U | 4/1984 |
| JP | H06-000187 U | 1/1994 |

*Primary Examiner* — Timothy J Brindley
(74) *Attorney, Agent, or Firm* — SGPatents PLLC

(57) ABSTRACT

In a vehicle seat, a seat back includes a backrest on which an occupant sitting on a seat cushion leans his/her back, and banks supporting the back of the sitting occupant on both sides. Urethane pads configuring the banks are formed in a shape protruded to the front with respect to a urethane pad configuring the backrest, the back face sides of the urethane pads configuring the banks formed in the shape protruded to the front are formed in a recessed shape with respect to a back face side of the urethane pad configuring the backrest, and on the portions of the back face sides of the urethane pads configuring the banks formed in the recessed shape, protrusions having faces at the same height as the back face side of the urethane pad configuring the backrest and extended to the portions formed in the recessed shape are formed.

10 Claims, 5 Drawing Sheets

VEHICLE SEAT

CLAIM OF PRIORITY

The present application claims priority from Japanese Patent Application JP 2019-69952 filed on Apr. 1, 2019, the content of which is hereby incorporated by reference into this application.

BACKGROUND

The present invention relates to a vehicle seat. More specifically, the present invention relates to a vehicle seat including a seat back provided with a lumbar support mechanism therein.

In the vehicle seat, an automobile seat is adopted in which a seat back includes a sitting section and a backrest, the backrest being provided with side supports at both the side edges thereof and with a lumbar support in the lower portion at the center thereof.

For the seat back of such an automobile seat, Japanese Unexamined Utility Model Application Publication No. Hei 06-000187 describes an automobile seat in which a backrest is provided with side supports at both the side edges thereof and with a lumbar support in the lower portion at the center thereof, side wires forming the core materials of the side supports have lower ends swingably mounted to both the side edges of a frame configuring the backrest, and a lumbar support plate forming the core material of the lumbar support is configured between both the side wires so as to be fixed integrally with the side wires.

Also, Japanese Unexamined Utility Model Application Publication No. Sho 59-052972 describes a vehicle seat in which side support wires protruded to the front are provided at both left and right side portions of a frame-shaped back frame, spring materials are tensioned across both the left and right ends of the back frame, and a one-sheet-like pad made of a foam material is placed from the tops of the spring materials to the tops of both the side support wires to have ridge-shaped side supports on the left and right sides thereof, the vehicle seat including cutout portions for adjusting cushion properties on the left and right sides of the pad located inwardly of the side support wires.

In the configuration of the seat back described in Japanese Unexamined Utility Model Application Publication No. Hei 06-000187, the backrest of the seat back is typically in the state of being recessed with respect to the side portions on both sides thereof. When, from this state, the lumbar support is protruded to the front to press the backrest of the seat back onto the back of an occupant, the backrest of the seat back is pushed out to the front, but the side portions on both sides of the backrest are spread to both sides, thereby greatly deforming the seat back.

On the other hand, Japanese Unexamined Utility Model Application Publication No. Sho 59-052972 describes the configuration in which the cutout portions are provided on the left and right sides of the center portion of the pad of the seat back so that the integrity of the center portion of the pad and the side portions of the pad supporting the side portions of a sitting person is reduced to allow the center portion of the pad to be easily moved for making the cushion properties good, but does not describe the configuration in which the lumbar support is provided.

SUMMARY

The present invention solves the problems of the conventional art, and provides a vehicle seat having a seat back provided with a lumbar support mechanism therein, the vehicle seat including the seat back in which even in the state where the lumbar support mechanism is operated to press a backrest of the seat back onto the back of an occupant, the left and right side portions of the backrest are prevented from being spread to both sides, so that the seat back can be prevented from being deformed.

To solve the above problems, the present invention provides a vehicle seat that includes a seat cushion, a seat back, and a headrest. The seat back includes a backrest on which an occupant sitting on the seat cushion leans his/her back, and banks supporting the back of the sitting occupant on both sides. Urethane pads configuring the banks are formed in a shape protruded to the front with respect to a urethane pad configuring the backrest, the back face sides of the portions of the urethane pads configuring the banks formed in the shape protruded to the front are formed in a recessed shape with respect to a back face side of the urethane pad configuring the backrest, and on the portions of the back face sides of the urethane pads configuring the banks formed in the recessed shape, protrusions having faces at the same height as the back face side of the urethane pad configuring the backrest and extended to the portions formed in the recessed shape are formed.

Also, to solve the above problems, the present invention provides a vehicle seat that includes a seat cushion, a seat back, and a headrest. The seat back includes a backrest on which an occupant sitting on the seat cushion leans his/her back, a pair of left and right banks supporting the back of the sitting occupant on both sides, a frame including a pair of straight portions corresponding to the pair of left and right banks and supporting a urethane pad configuring the backrest and urethane pads configuring the banks, a pair of metal plates fixed to the pair of straight portions of the frame, springs suspended on the pair of metal plates and supporting the backrest, and a lumbar plate pushing out the urethane pad configuring the backrest to the front. On the urethane pad configuring the backrest, protrusions abutted on the pair of metal plates fixed to the frame are formed.

According to the present invention, in the vehicle seat having the seat back provided with the lumbar support mechanism, even in the state where the lumbar support mechanism is operated to press the backrest of the seat back onto the back of the occupant, the left and right side portions of the backrest are prevented from being spread to both sides, so that the seat back can be prevented from being deformed.

These features and advantages of the invention will be apparent from the following more particular description of preferred embodiments of the invention, as illustrated in the accompanying drawings.

DESCRIPTION OF THE PREFERRED EMBODIMENTS

The present invention provides a vehicle seat having a seat back provided with a lumbar support mechanism therein, the vehicle seat including the seat back in which even in the state where the lumbar support mechanism is operated to press a backrest of the seat back onto the back of an occupant, the left and right side portions of the backrest are prevented from being spread to both sides, so that the seat back can be prevented from being deformed.

More specifically, portions abutted on side frames are formed on urethane pads of the seat back, so that even in the state where the lumbar support mechanism is operated to press the backrest of the seat back onto the back of the occupant, the left and right side portions of the backrest are prevented from being spread to both sides.

Embodiments of the present invention will be described below with reference to the drawings. It should be noted that the present invention is not limited to examples described below, and includes various modifications. The examples described below will be described in detail to simply describe the present invention, and are not necessarily required to include all the described configurations.

FIRST EXAMPLE

Figure 1:
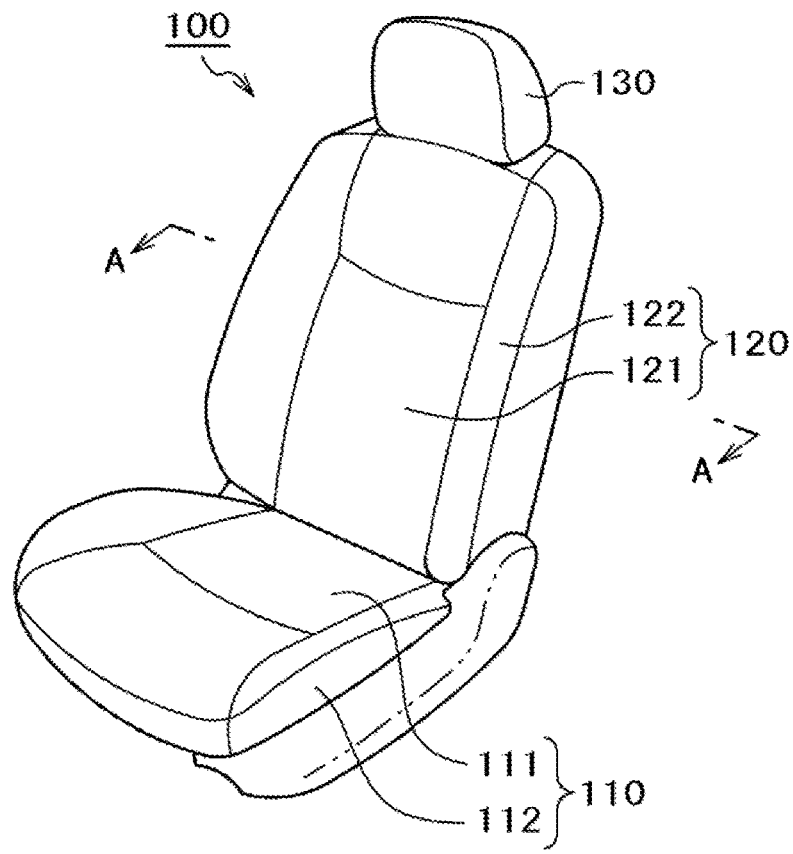
FIG. 1 is a perspective view illustrating the appearance of a vehicle seat according to a first example of the present invention.

FIG. 1 is a perspective view illustrating the appearance of a vehicle seat 100 according to a first example of the present invention. The vehicle seat 100 includes a seat cushion 110 on which an occupant sits, a seat back 120 on which the occupant sitting on the seat cushion 110 leans his/her back, and a headrest 130 protecting the head of the occupant sitting on the seat cushion 110.

The seat cushion 110 includes a sitting section 111, and seat cushion side banks 112 formed on both sides of the sitting section 111. On the other hand, the seat back 120 includes a backrest 121 on which the occupant sitting on the seat cushion 110 leans his/her back, and seat back side banks 122 formed on both sides of the backrest 121.

Figure 2:
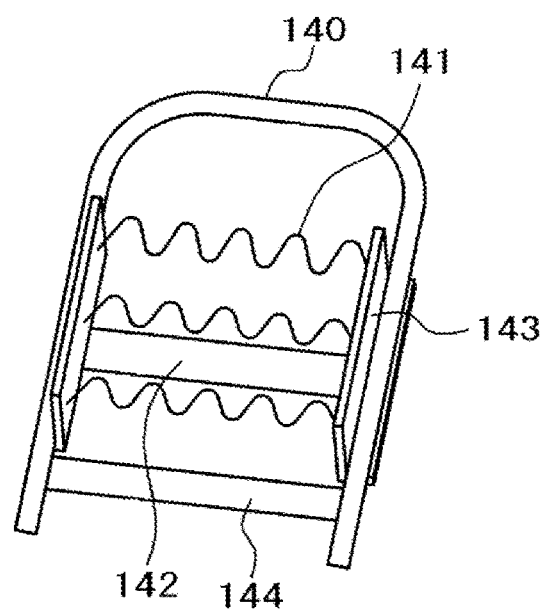
FIG. 2 is a perspective view illustrating the appearance of a frame formed by bending the pipe of a seat back of the vehicle seat according to the first example of the present invention.

FIG. 2 illustrates the appearance of a seat back side frame 140 supporting the seat back 120. The seat back side frame 140 is formed of a U-shaped metal pipe, and between the left and right straight portions of the U-shaped pipe, a plurality (in FIG. 2, three) of springs 141 pressing a seat back side urethane pad mounted on the seat back side frame 140 are suspended. The springs 141 are supported by a pair of left and right metal plates 143 fixed by welding and the like to the left and right straight portions of the U-shaped pipe of the seat back side frame 140.

The reference numeral 142 denotes a lumbar plate that is pushed out to the front and back (in the state in FIG. 2, to the up and down) by a driving mechanism, not illustrated, and partially moves the seat back side urethane pad to the front and back. The lumbar plate 142 is formed of a resin, such as Teflon (registered trademark).

The reference numeral 144 denotes a connecting plate that connects the vicinities of the left and right ends of the U-shaped pipe of the seat back side frame 140 and is welded and fixed to the vicinities of the left and right ends of the U-shaped pipe of the seat back side frame 140. Since the vicinities of the left and right ends of the U-shaped pipe are connected by the connecting plate 144, the seat back side frame 140 can maintain high rigidity, so that even when an external force is applied to the seat back side frame 140, the seat back side frame 140 can hold a fixed shape without being deformed.

Figure 3:
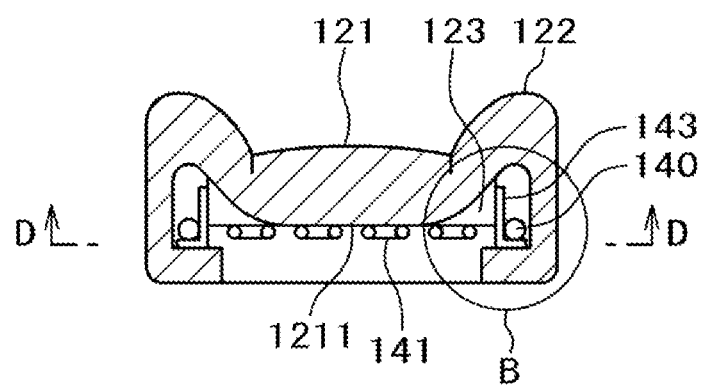
FIG. 3 is a diagram seen from the arrow direction along an A-A cross section in FIG. 1 of the vehicle seat according to the first example of the present invention.

FIG. 3 is a diagram seen from the arrow direction along an A-A cross section in FIG. 1 of the vehicle seat, and illustrates the state where the seat back 120 is molded so as to enclose the seat back side frame 140 by the backrest 121 of the seat back 120 and the seat back side banks 122 formed on both sides thereof. Actually, the seat back 120 has a configuration in which the surfaces of the urethane pads are covered by surface materials, but in the present example, for simple description, the seat back 120 is displayed by omitting the surface material portions.

In FIG. 3, the springs 141 suspended between the pair of left and right metal plates 143 fixed to the left and right sides of the U-shaped pipe of the seat back side frame 140 are abutted on a back side face 1211 of the urethane pad forming the backrest 121 (hereinafter, referred to as the backrest urethane pad 121), and support the load by the occupant who leans his/her back on the seat back 120.

In FIG. 3, the reference numeral 123 denotes a protrusion that is formed on the back side face 1211 side of the backrest urethane pad 121, and a pair of left and right protrusions 123 are formed corresponding to the pair of left and right metal plates 143 so as to be abutted on the pair of left and right metal plates 143 fixed to the left and right sides of the U-shaped pipe of the seat back side frame 140.

Figure 4:
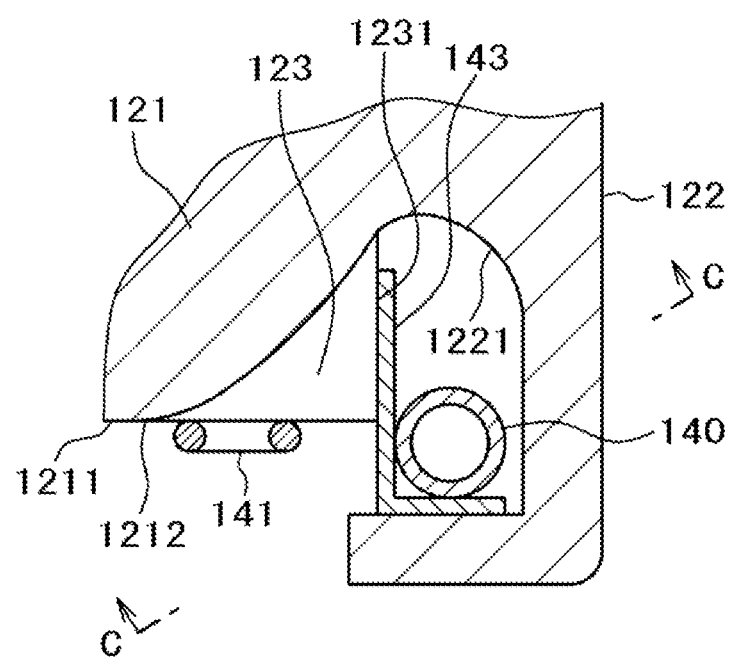
FIG. 4 is an enlarged view of the cross section of a B portion in FIG. 3 of the vehicle seat according to the first example of the present invention.

FIG. 4 illustrates an enlarged view of the state where the protrusions 123 are abutted on the pair of left and right metal plates 143 fixed to the left and right sides of the U-shaped pipe of the seat back side frame 140. FIG. 4 illustrates an enlarged view of the portion surrounded by a circle B in FIG. 3. The banks 122 connected to the backrest urethane pad 121 on the seat back side are connected to the back side face 1211 of the backrest urethane pad 121 located on the opposite side of the surface material covered side that is the side on which the occupant leans his/her back and facing the seat back side frame 140, and faces 1221 inside of the banks 122 are curved from the position of a line 1212 with respect to the backrest urethane pad 121 to be formed in a recessed shape so that the banks 122 do not interfere with the pair of left and right metal plates 143 fixed to the left and right sides of the U-shaped pipe of the seat back side frame 140.

On the contrary, an end face 1231 is abutted on the metal plate 143, so that the protrusion 123 formed on the back side face 1211 side of the backrest urethane pad 121 is restricted from being moved in the right direction in FIG. 4. Since the protrusion 123 is abutted on the metal plate 143 in this way, the backrest urethane pad 121 on which the protrusion 123 is formed cannot be moved in the right direction in FIG. 4, and the seat back side bank 122 is not spread to the right side in FIG. 4.

That is, in the present example, as illustrated in FIG. 4, the urethane pad configuring the bank 122 (hereinafter, referred to as the bank urethane pad 122) is formed in a shape protruded to the front with respect to the backrest urethane pad 121, the back face side of the portion of the bank urethane pad 122 formed in the shape protruded to the front is formed in the recessed shape with respect to the back face side of the backrest urethane pad 121, and on the portion of the back face side of the bank urethane pad 122 formed in the recessed shape, the protrusion 123 having the face at the same height as the back face side 1211 of the backrest urethane pad 121 and extended to the face 1221 formed in the recessed shape is formed.

Figure 5:
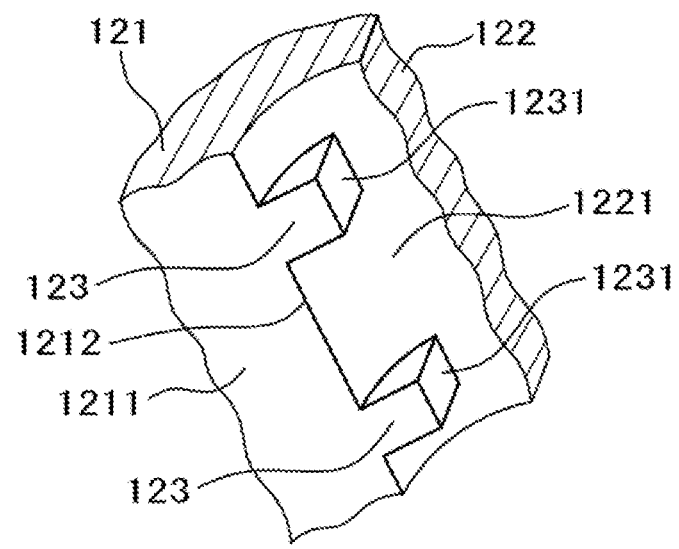
FIG. 5 is a diagram seen from the arrow direction along a C-C cross section in FIG. 4 of the vehicle seat according to the first example of the present invention.

FIG. 5 illustrates a diagram in which the protrusions 123 formed on the back side face 1211 side of the backrest urethane pad 121 are seen from the arrow direction along a C-C cross section in FIG. 4. On the curved face 1221 inside of the bank urethane pad 122, the protrusions 123 in the state of being extended flatly from the back side face 1211 of the backrest urethane pad 121 are discretely formed to avoid the interference with the plurality of springs 141 suspended on the metal plates 143 fixed by welding and the like to the seat back side frame 140.

As illustrated in FIG. 4, the end faces 1231 of the protrusions 123 on the backrest urethane pad 121 are abutted on the metal plates 143 fixed by welding and the like to the seat back side frame 140, so that the end faces 1231 are prevented from being spread beyond the metal plates 143 to the outside.

Figure 6:
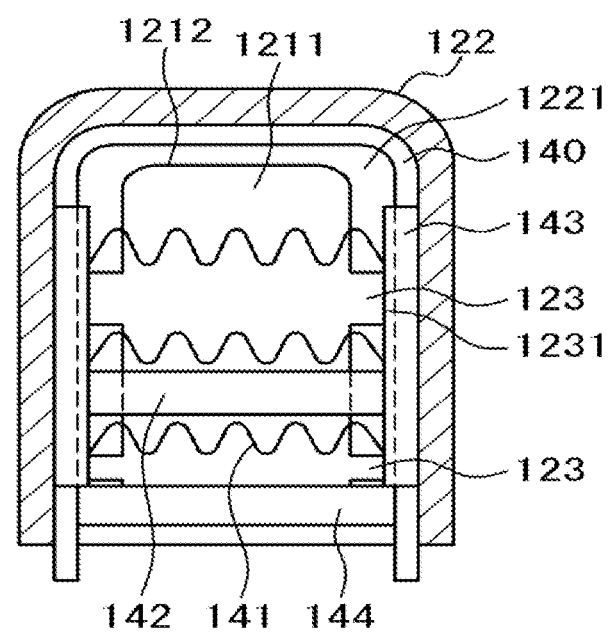
FIG. 6 is a diagram seen from the arrow direction along a D-D cross section in FIG. 3 of the vehicle seat according to the first example of the present invention.

FIG. 6 illustrates a diagram seen from the arrow direction along a D-D cross section in FIG. 3. The state illustrated in FIG. 6 is the state where the seat back side frame 140 illustrated in FIG. 2 is seen from the opposite side of the sheet surface (drawing face) in FIG. 2.

The springs 141 suspended between the pair of metal plates 143 fixed to the left and right sides of the U-shaped pipe of the seat back side frame 140 and the lumbar plate 142 are abutted on the back side face 1211 of the backrest urethane pad 121. In this state, in the protrusions 123 extended from the back side face 1211 of the backrest urethane pad 121, their end faces 1231 are abutted on the pair of left and right metal plates 143 fixed by welding and the like to the seat back side frame 140, and are thus prevented from being spread in the left and right direction in FIG. 6.

Figure 7:
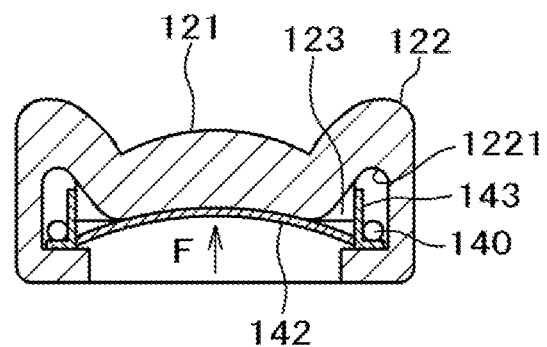
FIG. 7 is a diagram seen from the arrow direction along the cross section of the portion of a lumbar plate of the vehicle seat according to the first example of the present invention.

Since the seat back 120 is made to have such the configuration, when a force pushing out the lumbar plate 142 to the front (in the direction on the back side of the sheet surface in FIG. 6) by the mechanism, not illustrated, is applied to the backrest urethane pad 121 and as illustrated in FIG. 7, a force F in the arrow direction so as to push out the center portion of the backrest urethane pad 121 to the front is applied, and when the protrusions 123 are not formed on the backrest urethane pad 121, the curved faces 1221 formed inside of the bank urethane pads 122 are slid up along the pair of left and right metal plates 143 fixed by welding and the like to the seat back side frame 140, so that the bank urethane pads 122 are spread to the outside.

On the contrary, in the present example, since the protrusions 123 are formed on the backrest urethane pad 121, when the force F in the arrow direction so as to push out the center portion of the backrest urethane pad 121 to the front is applied, the end faces 1231 of the protrusions 123 are simply strongly abutted on the pair of left and right metal plates 143 fixed by welding and the like to the seat back side frame 140, and are not spread to the outside more, so that the bank urethane pads 122 are avoided from being spread to the outside.

That is, the seat back 120 of the vehicle seat 100 according to the present example includes the backrest on which the occupant sitting on the seat cushion 110 leans his/her back, the pair of left and right banks supporting the back of the sitting occupant on both sides, the seat back side frame 140 including the pair of left and right straight portions corresponding to the pair of left and right banks and supporting the urethane pad 121 configuring the backrest and the urethane pads 122 configuring the banks, the pair of left and right metal plates 143 fixed to the pair of left and right straight portions of the seat back side frame 140, the springs 141 suspended on the pair of left and right metal plates 143 and supporting the backrest 121, and the lumbar plate 142 pushing out the backrest urethane pad 121 to the front, and on the backrest urethane pad 121, the pair of left and right protrusions 123 abutted on the pair of left and right metal plates 143 fixed to the seat back side frame 140 are formed.

According to the present example, the protrusions 123 formed on the backrest urethane pad 121 are abutted on the pair of left and right metal plates 143 fixed to the seat back side frame 140, so that when the lumbar mechanism is operated to push out the backrest urethane pad 121 to the front, the bank urethane pads 122 connected to the backrest urethane pad 121 can be prevented from being spread to the outside, and the seat back 120 can thus be prevented from being deformed.

Also, according to the present example, it is not necessary to provide any new components in order that when the lumbar mechanism is operated to push out the backrest urethane pad 121 to the front, the bank urethane pads 122 connected to the backrest urethane pad 121 are prevented from being spread to the outside, and while the configuration of the seat back 120 is simple, it is possible to prevent the change in the appearance of the seat back 120 due to the spread of the bank urethane pads 122 to the outside.

It should be noted that in the above-described example, the configuration in which the seat back side frame 140 is formed of the pipe, and the pair of left and right metal plates 143 are fixed thereto by welding has been described, but the seat back side frame 140 may be formed of a plate material to be formed integrally with the pair of left and right metal plates 143.

First Modification

As a first modification of the first example, the protrusions 123 formed on the backrest urethane pad 121 are formed of a material harder than the backrest urethane pad 121. The outer shape is the same as that described in the first example, and its illustration is omitted.

In this case, the backrest urethane pad 121 and the bank urethane pads 122 of the portions that the back of the sitting occupant touches are formed of a flexible material as in the case of the first example, so that the same comfortability as in the case of the first example can be provided to the sitting occupant.

On the other hand, the protrusions 123 formed of a material harder than the portion of the backrest urethane pad 121 are abutted on the pair of left and right metal plates 143 fixed to the seat back side frame 140, so that the deformation amount of the protrusions 123 can be reduced.

With this, when the lumbar mechanism is operated to push out the backrest urethane pad 121 to the front, the bank urethane pads 122 connected to the backrest urethane pad 121 can be prevented from being spread to the outside, and as compared with the first example, the seat back 120 can be further prevented from being deformed.

Second Modification

As a second modification of the first example, the protrusions 123 formed on the backrest urethane pad 121 and the bank urethane pads 122 are formed of a material harder than the backrest urethane pad 121. The outer shape is the same as that described in the first example, and its illustration is omitted.

In this case, the backrest urethane pad 121 of the portion that the back of the sitting occupant touches is formed of a flexible material as in the case of the first example, so that the same comfortability as in the case of the first example can be provided to the sitting occupant. On the other hand, the bank urethane pads 122 are formed of a material harder than the backrest urethane pad 121, but since the bank urethane pads 122 are not the portions that the sitting occupant mainly touches, the comfortability of the sitting occupant is not deteriorated.

According to the present modification, when the lumbar mechanism is operated to push out the backrest urethane pad 121 to the front, the protrusions 123 formed of a material harder than the portion of the backrest urethane pad 121 are abutted on the pair of left and right metal plates 143 fixed to the seat back side frame 140, so that the deformation amount of the protrusions 123 can be reduced, and the bank urethane pads 122 formed of the same hard material as the protrusions 123 can thus be prevented from being spread to the outside, and as compared with the first example, the seat back 120 can thus be further prevented from being deformed.

SECOND EXAMPLE

Figure 8:
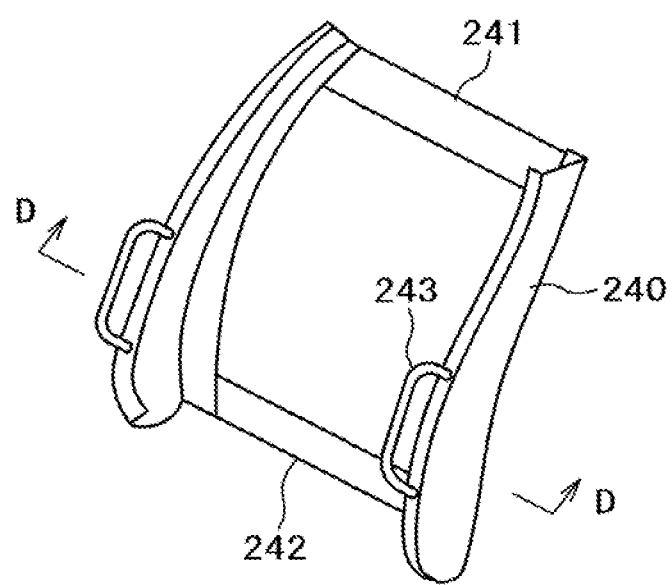
FIG. 8 is a perspective view illustrating the appearance of a frame formed by processing plate-shaped members of the seat back of the vehicle seat according to a second example of the present invention.

A second example of the present invention will be described with reference to FIGS. 8 to 10. The same portions as the first example are indicated by the same reference numerals, and the overlapped description is avoided. The difference from the first example is the seat back side frame. That is, in the first example, the seat back side frame 140 is formed of the U-shaped metal pipe, as illustrated in FIG. 2, whereas in the present example, as illustrated in FIG. 8, the seat back 120 has a configuration in which side frames 240 processed from a pair of plate-shaped members are connected by plate-shaped members 241 and 242. It should be noted that in the configuration illustrated in FIG. 8, the display of the springs 141 and the lumbar plate 142 illustrated in FIG. 2 in the first example is omitted.

In the configuration in FIG. 8, the reference numeral 243 denotes a wire that supports therein each of the seat back side banks 122 formed on each of both sides of the backrest 121 of the seat cushion 110 illustrated in FIG. 1.

Figure 9:
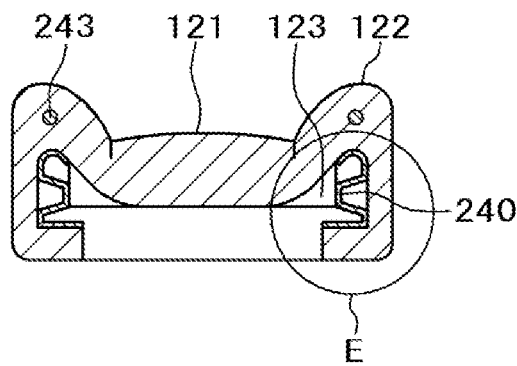
FIG. 9 is a diagram seen from the arrow direction along a D-D cross section in FIG. 8 of the vehicle seat according to the second example of the present invention.

FIG. 9 is a diagram corresponding to FIG. 3 in the first example and corresponds to a diagram seen from the arrow direction along the A-A cross section in FIG. 1 of the vehicle seat. The state is illustrated where the seat back 120 is molded so as to enclose the side frames 240 by the backrest 121 of the seat back 120 and the seat back side banks 122 formed on both sides. Actually, the seat back 120 has a configuration in which the surfaces of the urethane pads are covered by the surface materials, but in the present example, for simple description, the seat back 120 is displayed by omitting the surface material portions.

In FIG. 8, the side faces of the side frames 240 are illustrated to be in a flat state, but actually, as its cross section is illustrated in FIG. 9, the seat back 120 has a configuration in which convex and concave portions are formed to the side frames 240 to reinforce their strength.

In FIG. 9, the reference numeral 123 denotes the protrusion that is formed on the back side of the backrest urethane pad 121, and a pair of left and right protrusions 123 are formed corresponding to the pair of left and right side frames 240 so as to be abutted on the side frames 240.

Figure 10:
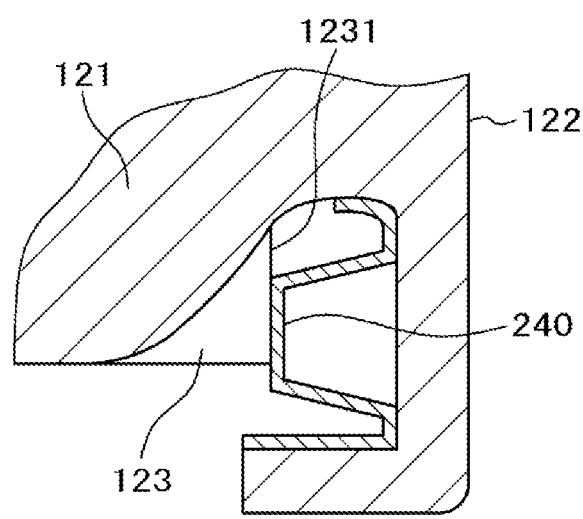
FIG. 10 is an enlarged view of the cross section of an E portion in FIG. 9 of the vehicle seat according to the second example of the present invention.

FIG. 10 illustrates an enlarged view of the state where the protrusion 123 is abutted on the side frame 240. FIG. 10 illustrates an enlarged view of the portion surrounded by a circle E in FIG. 9. The end face 1231 of the protrusion 123 is abutted on the side frame 240, so that the protrusion 123 formed on the back side of the backrest urethane pad 121 is restricted from being moved in the right direction in FIG. 10. Since the protrusion 123 is abutted on the side frame 240 in this way, as in the case of the first example, the backrest urethane pad 121 on which the protrusion 123 is formed cannot be moved in the right direction in FIG. 10, and the seat back side bank 122 is also supported by the wire 243, and can thus be prevented from being spread to the right side in FIG. 10.

The invention that has been made by the present inventors has been specifically described above on the basis of the examples, but the present invention is not limited to the examples, and needless to say, various modifications can be made in the scope not departing from its purport. For example, the above-described examples have been described in detail to simply describe the present invention, and are not necessarily required to include all the described configurations. In addition, part of the configuration of each of the examples can be subjected to the addition, deletion, and replacement with respect to other configurations.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. A vehicle seat that includes a seat cushion, a seat back, and a headrest,
   wherein the seat back includes:
   a backrest on which an occupant sitting on the seat cushion leans his/her back; and
   banks supporting the back of the sitting occupant on both sides, and
   wherein urethane pads configuring the banks are formed in a shape protruded to the front with respect to a urethane pad configuring the backrest, the back face sides of the portions of the urethane pads configuring the banks formed in the shape protruded to the front are formed in a recessed shape with respect to a back face side of the urethane pad configuring the backrest, and on the portions of the back face sides of the urethane pads configuring the banks formed in the recessed shape, protrusions having faces at the same height as the back face side of the urethane pad configuring the backrest and extended to the portions formed in the recessed shape are formed.

2. The vehicle seat according to claim 1, wherein the banks are formed on both sides of the backrest, and the protrusions having faces at the same height as the back face side of the urethane pad configuring the backrest and extended to the portions formed in the recessed shape are formed corresponding to the banks formed on both sides of the backrest.

3. The vehicle seat according to claim 2, wherein the protrusions are formed in a plurality of pairs.

4. The vehicle seat according to claim 1, wherein the protrusions are formed of a material harder than the urethane pad configuring the backrest.

5. The vehicle seat according to claim 1, wherein the protrusions and the urethane pads configuring the banks are formed of a material harder than the urethane pad configuring the backrest.

6. A vehicle seat that includes a seat cushion, a seat back, and a headrest,
wherein the seat back includes:
a backrest on which an occupant sitting on the seat cushion leans his/her back;
a pair of left and right banks supporting the back of the sitting occupant on both sides;
a frame including a pair of left and right straight portions corresponding to the pair of left and right banks and supporting a urethane pad configuring the backrest and urethane pads configuring the pair of left and right banks;
a pair of left and right metal plates fixed to the pair of left and right straight portions of the frame;
springs suspended on the pair of left and right metal plates and supporting the backrest; and
a lumbar plate pushing out the urethane pad configuring the backrest to the front, and
wherein on the urethane pad configuring the backrest, a pair of left and right protrusions abutted on the pair of left and right metal plates fixed to the frame are formed.

7. The vehicle seat according to claim 6, wherein the pair of left and right protrusions are formed at a plurality of locations of the urethane pad configuring the backrest.

8. The vehicle seat according to claim 7, wherein the pair of left and right protrusions are abutted on the pair of left and right metal plates fixed to the frame when the urethane pad configuring the backrest is pushed out to the front by the lumbar plate, so that the pair of left and right banks are prevented from being spread to the outside.

9. The vehicle seat according to claim 6, wherein the pair of left and right protrusions are formed of a material harder than the urethane pad configuring the backrest.

10. The vehicle seat according to claim 6, wherein the pair of left and right protrusions and the urethane pads configuring the banks are formed of a material harder than the urethane pad configuring the backrest.

* * * * *